July 6, 1943.   G. D. BOWER   2,323,370
CYCLIC THERMOSTAT CONTROL
Filed April 6, 1940   6 Sheets-Sheet 1
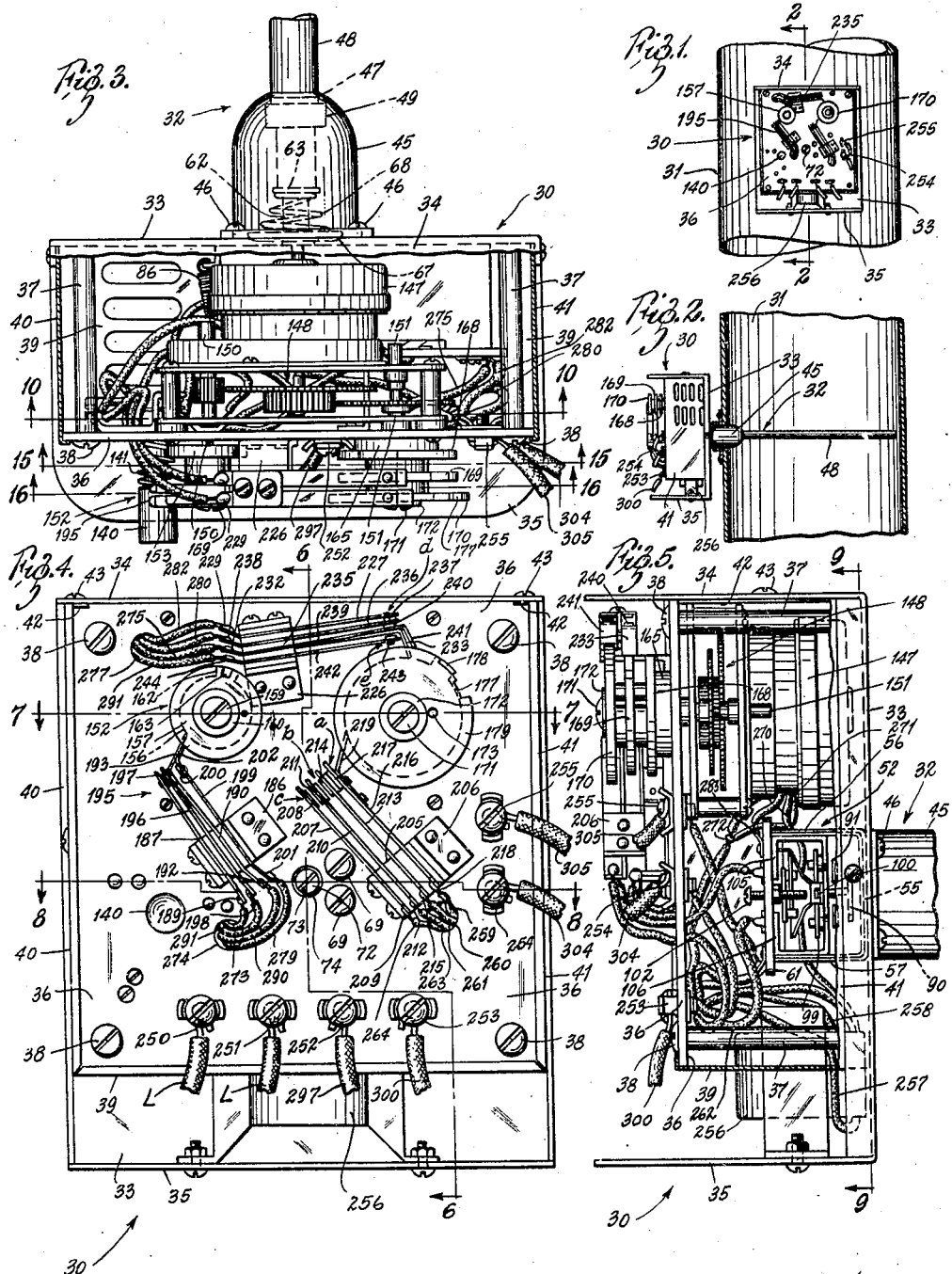
INVENTOR:
GEORGE D. BOWER,
BY Lawrence C. Kingsland
ATTORNEY.

July 6, 1943. G. D. BOWER 2,323,370
CYCLIC THERMOSTAT CONTROL
Filed April 6, 1940 6 Sheets-Sheet 2
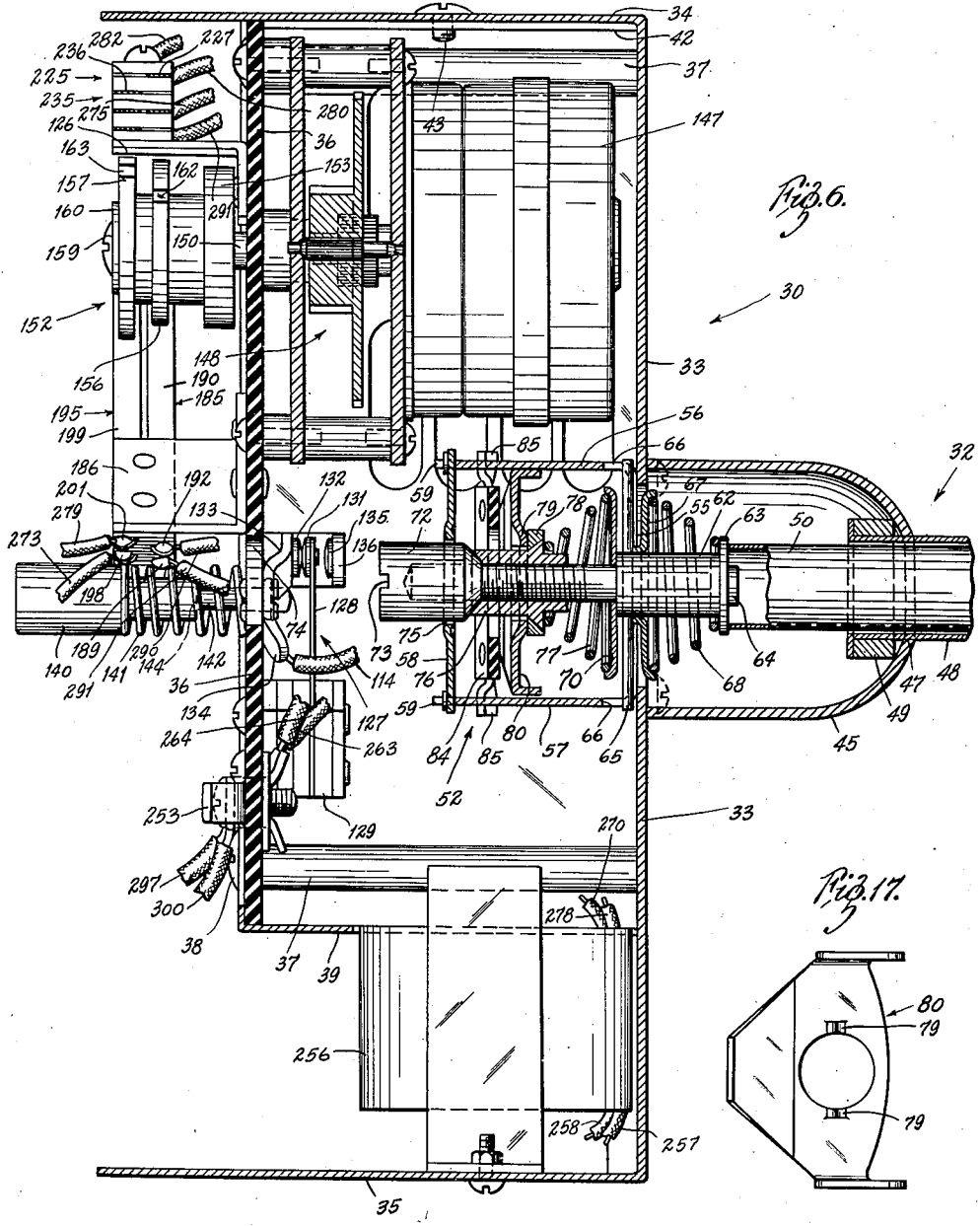
Fig. 6.
Fig. 17.
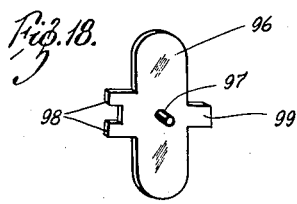
Fig. 18.
INVENTOR:
GEORGE D. BOWER,
BY Lawrence C. Kingsland
ATTORNEY.

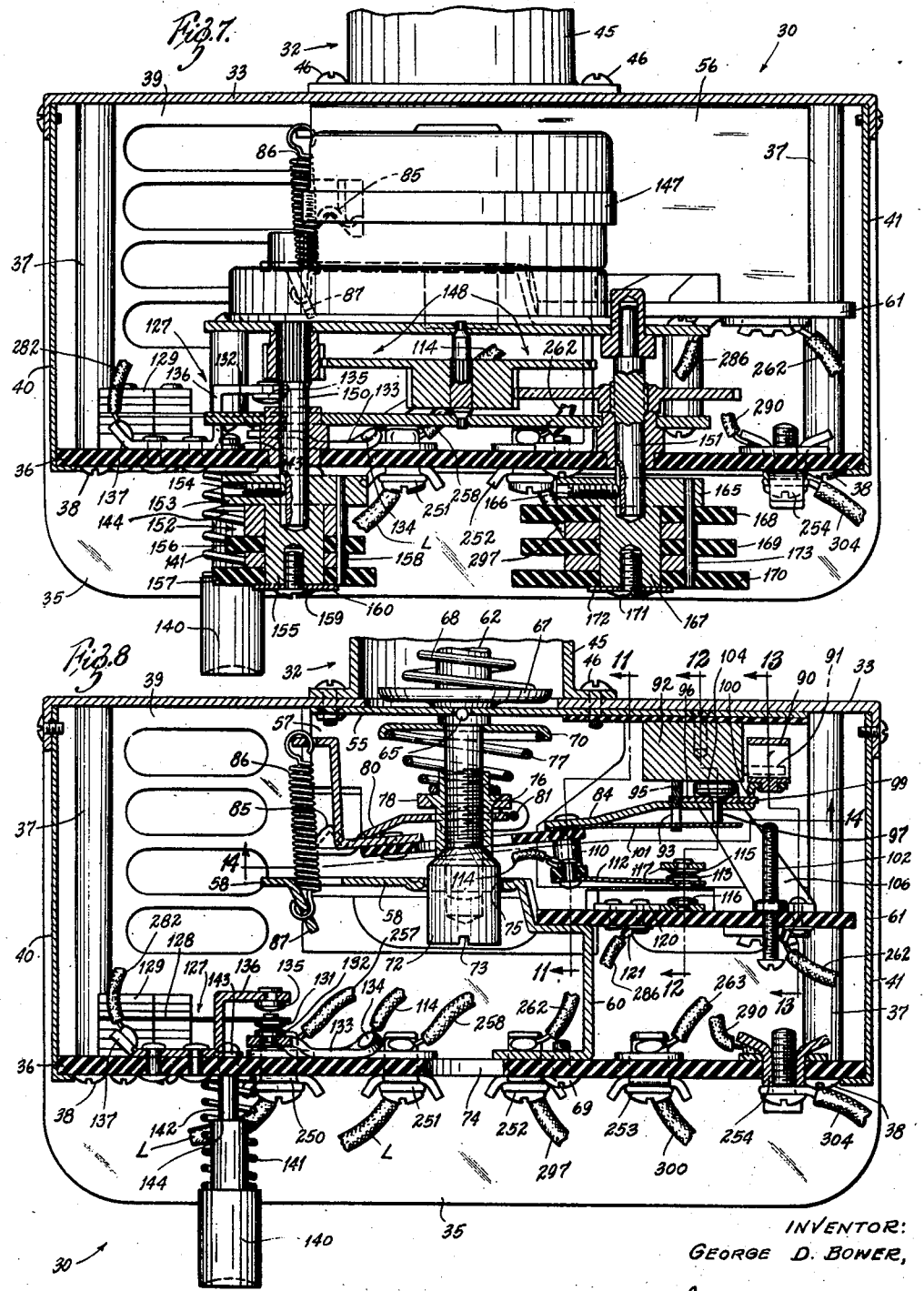

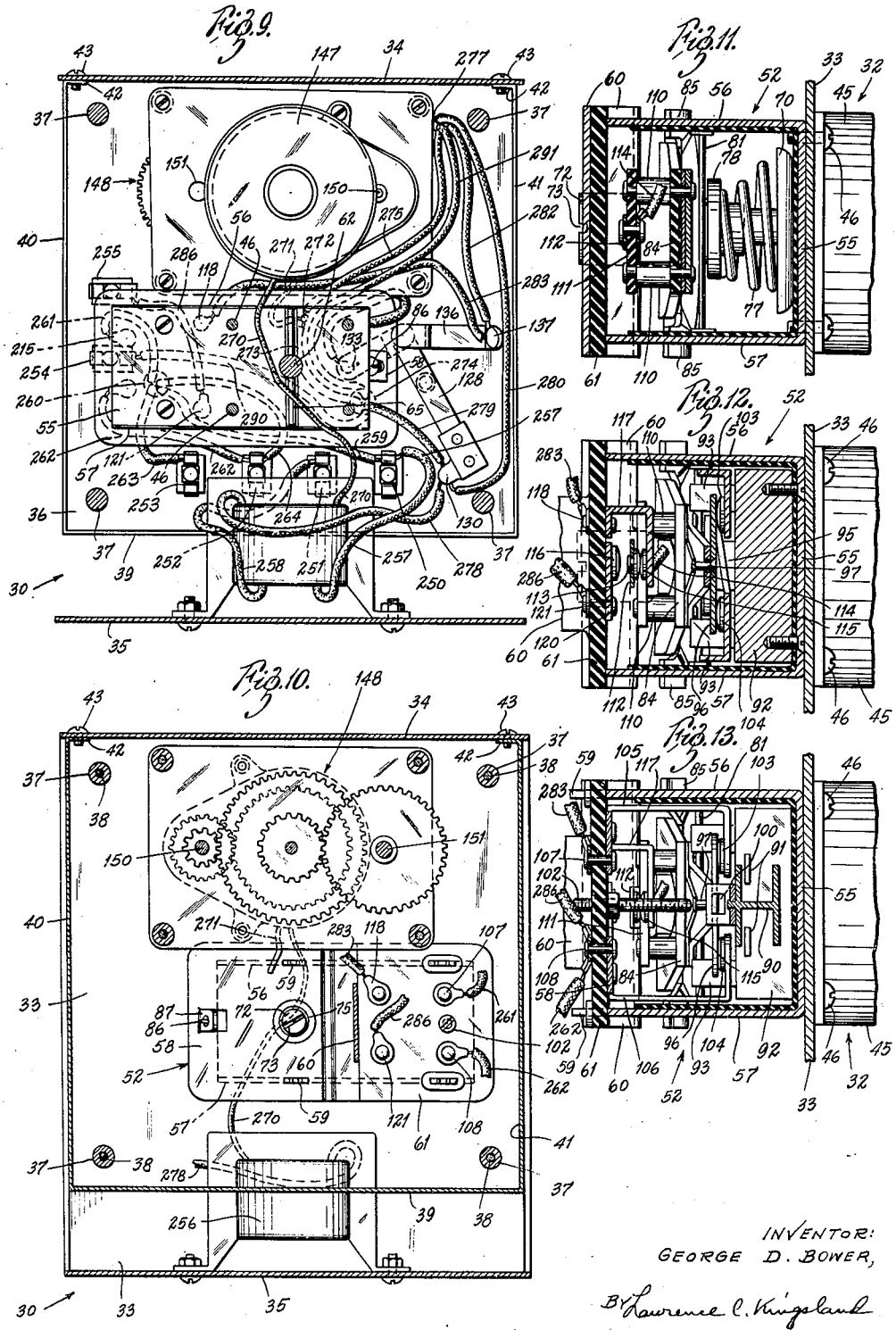

July 6, 1943. G. D. BOWER 2,323,370
CYCLIC THERMOSTAT CONTROL
Filed April 6, 1940 6 Sheets-Sheet 5
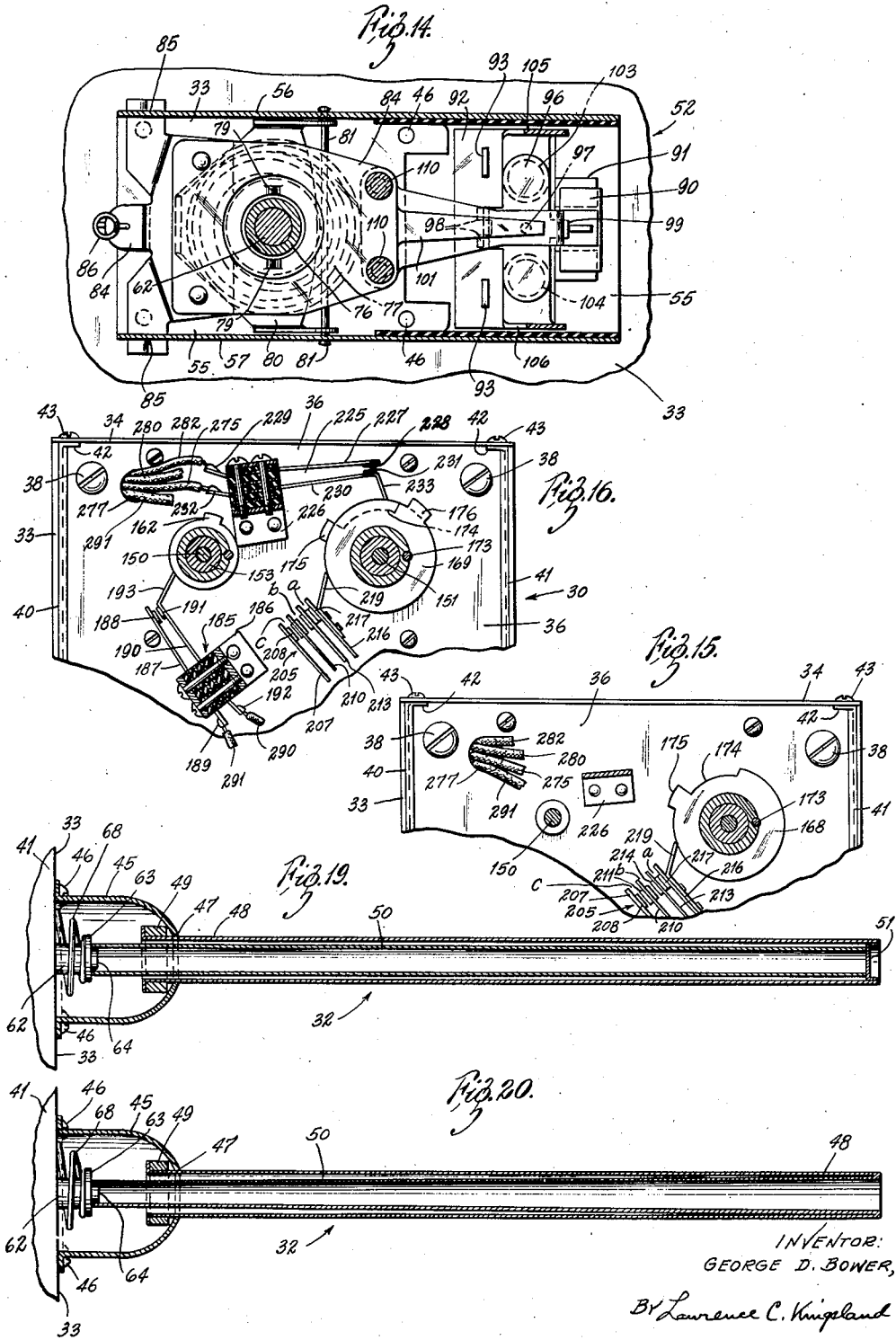
INVENTOR:
GEORGE D. BOWER,
BY Lawrence C. Kingsland
ATTORNEY.

July 6, 1943.   G. D. BOWER   2,323,370
CYCLIC THERMOSTAT CONTROL
Filed April 6, 1940   6 Sheets-Sheet 6

INVENTOR
GEORGE D. BOWER,
BY Lawrence C. Kingsland
ATTORNEY.

Patented July 6, 1943

2,323,370

UNITED STATES PATENT OFFICE 2,323,370

CYCLIC THERMOSTAT CONTROL

George D. Bower, St. Louis, Mo., assignor to Automatic Control Corporation, St. Louis, Mo., a corporation of Delaware Application April 6, 1940, Serial No. 328,177

25 Claims. (Cl. 158—28)

The present invention relates to a control for a heat-change producing unit and especially one of the heating variety. It has applicability to a furnace control having a feed unit, such as a burner motor, and ignition mechanism. The control operates these units cyclically based upon the temperature of the space being heated and limited by whether or not the mechanisms operate within a given time interval.

The control unit includes a heat-change device responsive to rate of heat change, disposed in position to receive substantially immediately and react rapidly to any sudden heat changes effected by operation or failure of the heat-change means; and a stack switch operated by the said device. The unit includes also a control motor, which motor rotates a series of cams, certain of which control and determine the characteristics of a cycle of operation for the control motor, and certain of which, in fixed relationship to the previous ones, control the burner motor and ignition. There is also a manual reset switch by means of which the cycle may be restarted in the event of its failure after having been previously started.

Among the objects of the invention are the provision of a rate of heat-change device and a cyclic control under control thereof for the actuation of the heat-change producing unit; a control for the unit that gives a definite starting period, a definite running period, and a definite inactive "off" (or scavenging) period; the provision of an independent definite ignition timing, starting with or before fuel and air supply.

Further objects include the provision of a control of this type, having a definite starting period, time controlled, with means providing that, if at the end of the starting period proper ignition has not occurred, the control deenergizes everything and must be manually reset for further operation.

Furthermore, it is an object to provide that, if power failure or flame failure follows completion of a starting cycle, the control will cut fuel, air and ignition means but will allow the control motor to go on to its starting point and to a position wherein it will re-institute the cycle if there is a demand at the space theremostat.

A further object is the combination with a control of this type for starting and operating a heat-change producing device, of a device responsive to rate of change of heat to shut off operation of the fuel supply upon sharp and abnormal heat changes, but not to cut it off upon normal regulatory changes, and particularly with said cut-off occurring quickly.

It is a further object of the invention to provide such a control applicable to any conmbustive type of heater including stokers, oil burners, and the like.

It is a further object to provide such a control that may be used in connection with a pilot, for example, such as a gas burner.

A further object is to provide a control unit, whose predetermined cycle is not affected by manipulation of the thermostat.

In the drawings:

Fig. 1 (Sheet 1) is a front elevation of the control unit, less its cover, in place on a flue or stack;

Fig. 2 is a side elevation, partly in section, of the unit of Fig. 1, taken on the line 2—2 of Fig. 1;

Fig. 3 is a plan view of the unit with the casing partly broken away;

Fig. 4 is a front elevation of the unit;

Fig. 5 is a side elevation, taken from the right of Fig. 4, with the casing partly in section;

Fig. 6 (Sheet 2) is a mainly medial, vertical broken section taken on the line 6—6 of Fig. 4;

Fig. 7 (Sheet 3) is a horizontal upper section taken on the line 7—7 of Fig. 4 through both cam axes;

Fig. 8 is a mainly medial, partly broken, horizontal section on the line 8—8 of Fig. 4 through the main axis of the stack switch;

Fig. 9 (Sheet 4) is substantially a rear elevation of the control unit with the casing in section, taken on the line 9—9 of Fig. 5;

Fig. 10 is a vertical section viewed from the front of the control, taken on the line 10—10 of Fig. 3;

Fig. 11 is a vertical section through the stack switch, taken on the line 11—11 at the upper right middle of Fig. 8 and showing the mounting of the secondary switch blade;

Fig. 12 is a vertical section on the line 12—12 at the right of Fig. 8, showing the contact mountings for both the primary and secondary switches of the stack switch device;

Fig. 13 is a vertical section taken on the line 13—13 at the far right of Fig. 8;

Fig. 14 (Sheet 5) is a vertical section on the line 14—14 transversely across the middle of Fig. 8, showing in particular the switch lever of the stack control;

Fig. 15 is a vertical section on the line 15—15 of Fig. 3, showing the main timing switch and cam;

Fig. 16 is a vertical section on the line 16—16 of Fig. 3, showing in particular the cycle-starting switch and cam; and the intermediate holding circuit switch and cam, which cam is superposed over the one shown in Fig. 15;

Fig. 17 (Sheet 2) shows the primary lever of the stack switch;

Fig. 18 (Sheet 2) shows the contact bar of the primary stack switch;

Fig. 19 (Sheet 5) is an axial section through the heat-change responsive unit of the stack switch;

Fig. 20 is a similar section through a modified heat-change responsive unit for the stack switch;

Figure 21:
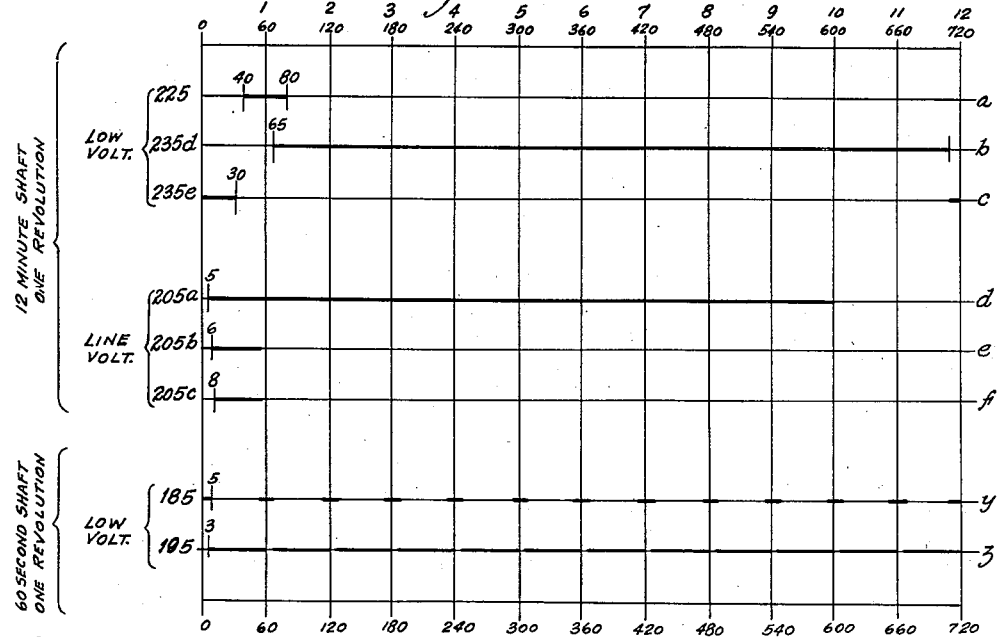
Fig. 21 (Sheet 6) is a cyclic diagram of the operation of the control.

In the exemplification to be described, this control unit is shown applied to an oil-burning furnace which has an ignition means such as a spark plug, and has what is here designated a burner motor and which is intended to designate that unit controlling supply of fuel and air to the furnace.

The control unit includes a casing, from the back of which projects a heat-change responsive device, called here by the trade-name "Thermutator," and distinguished from the usual thermostat in that it is operated in response to heat changes applied above a given minimum rate, and regardless of the starting temperature. The device is mounted with the thermal unit projecting into some part of the furnace that is quickly responsive to heat of the burner and to a change in that heat produced, such as would occur when the burner cuts on or off.

As here shown (Figs. 1 and 2), the control box 30 is mounted on a flue 31 and has the thermal element generally designated 32 projecting into the flue.

The box has a U-shaped bracket with a back 33, from which extend a top 34 and a bottom 35. A forward panel board 36 of insulating material is supported in spaced relation to the back 33 by four posts 37 secured to the back plate, and with screws 38 passing through the board 36 and into the posts 37. The board 36 extends downwardly from the top 34 but terminates above the bottom 35. A U-shaped casing having a bottom 39 and sides 40 and 41 cooperates with the bracket and the panel 36 to form an enclosure. It has a flange around its front portion, bent over the board 36. The casing 39 has flanges 42 at its upper end adjacent the top wall 34. Screws 43 hold the flanges 42 and hence the casing to the top wall 34.

The Thermutator

The stack control includes a domed member 45 extending from the back wall 33 and held thereto by four screws 46. An opening 47 is provided through the apex of the member 45, and through it extends a tube 48 having a collar 49 thereon limiting the outward movement of the tube through the hole 47. Within the tube 48 is a second tube 50. This tube, at its outer end, abuts a concave cap 51 secured to the outer end of the tube 48, enclosing the same.

An alternative to the cap 51 is shown in Fig. 20, wherein the inner tube 50 is made integral with the tube 48 at the outer end, as by welding. This produces a joint of greater heat conductivity rate than that of Fig. 19.

The thermutator is here a device operable in response to heat changes produced at at least a predetermined rate. Hence, it may be described as responsive to rate of heat change, upwardly or downwardly. Its operation is independent of ambient temperatures, so that it will operate upon heat change at a sufficient rate from any starting or initial temperature. It is independent of slower temperature increases and decreases, such as the regulations imposed by controls now well-known, since such changes are at rates too slow to cause the thermutator to shift the switch.

The Thermutator consists of two members, preferably tubes, secured together adjacent one end, one within the other, and with the inner member attached at its free end to a cold reservoir such as the switch. The outer tube is subjected through the major part of its length to the heat of the burner, as by being located in the stack or bonnet of the furnace, so that it will quickly receive changes in heat produced, and will be supplied with a relatively infinite source of supply of heat, whereby it will not be reduced in temperature by any substantial degree because of the discharge of heat into the inner tube.

The inner tube receives a substantial, if not major, part of its heat by conduction from the outer, through their junction. Hence, the attached end of this tube may be about the same temperature as the outer tube; and the heat from the outer end flows inwardly and ultimately into the cold reservoir, or casing. The inner end of the tube is thus much cooler than the outer, and the intermediate portions are at intermediate temperatures, varied somewhat by other factors, such as radiation, etc. However, since the outer tube is at one high temperature for a large part of its length—a much larger part than the inner tube—called its immersion depth, it can readily be seen that the outer tube under such circumstances will have a greater total expansion than the inner, and the inner end of the inner tube will be displaced.

After a short interval of the application of heat to the outer tube, the flow of heat to the inner tube will cause it to expand, and it will again approach the length of the outer, and reduce the difference in their two lengths. The time required for this to occur may be controlled by varying the heat conductivity of the joint between the two tubes, and the conductivity of the path of heat flow whereby the temperature of the inner tube is raised. Increasing the resistance to this flow of heat slows down the rate at which the inner tube follows expansion and contraction of the outer. Increasing of the resistance to flow of heat from the end of the inner tube to the cold reservoir reduces the length of time required for the inner tube to follow expansions of the outer, and increases the length of time required for the inner tube to follow contractions of the outer tube, but the latter is ordinarily so slight as not to require consideration.

Since the inner tube is secured to the cold reservoir at one end, it will never return to its starting length so long as the outer tube is at a different temperature. Whereas the outer tube is subjected to an infinite heat reservoir so that it does not lose length by the heat transmitted to the inner (and the heat lost from the outer tube to the casing may be disregarded here), the inner tube constantly loses heat to the cold reservoir, owing to the fact that the receptivity of the cold reservoir is large relative to the conductivity of the connection between the two tubes. This constant heat loss of the inner tube prevents its ever having heat gain sufficient to have the same length as the outer tube at a temperature above that of the cold reservoir—which usually is somewhat above room temperature.

In recapitulation, at the start, both tubes are at rest temperature, and of the same length. (Of course, they need not be of identical length, and the term "same" is meant in its broad sense to mean their relative lengths at the start.) The switch is in its first position. Upon sudden application of heat to the outer tube, it will rapidly lengthen, displacing the inner end of the substantially unaffected inner tube to shift the switch to second position. After an interval of lag, the inner tube will expand, approaching the outer, but never reaching it, and the switch remains in second position.

Should any variations in the heat produced by the burner occur, as in accordance with normal regulation, a relatively slow change of temperature may occur. In such case, the change in temperatures of the inner and outer tubes will occur closely enough together to prevent displacement of the inner end of the inner tube enough to shift the switch.

When there subsequently occurs a sharp reduction of temperature about the outer tube, such as when the burner is cut off, it will cool rapidly and contract. Owing to the resistance of the joint between the tubes, the flow of heat from the inner to the outer will be slow, and the reduction in length of the inner tube will lag that of the outer. This will cause an exaggerated and rapid displacement of the free end of the inner tube to return the switch to starting position promptly after the burner stops—again regardless of the temperature of the thermutator when the action begins. When the inner tube contracts, in due course, the two tubes will approach the same length determined by the new temperature. If that new temperature be the cold reservoir temperature, the tubes will attain the same length. If it be above the cold reservoir temperature, the inner tube will always be somewhat shorter than the outer, but not enough to cause shifting of the switch.

The rate of heat transfer between the tubes is only relatively slow, since actually the inner tube may attain its maximum heat from the outer in a few seconds. However, the reaching of maximum differential occurs even more quickly, and actuates the switch. The rate of heat transfer is thus sufficient to enable the two tubes to move together closely enough to avoid shifting the switch upon regulations of the burner, but insufficient to prevent shifting when the burner changes suddenly. The proper conductivity is determined by the thickness of the tubes and other factors.

*Stack switch*

Relative movement by expansion between the tubes 48 and 50 causes actuation of the stack switch, generally designated 52. This switch is preferably attached as a unit to the back wall 33. It includes a channel-shaped casing having a back wall 55 and side walls 56 and 57. The screws 46 pass through the wall 55 and secure the switch to the back wall 33 of the control.

The front section of the switch is in two parts. One part consists of a plate 58 attached across the walls 56 and 57 as by bradding 59. This member 58 has a bracket 60 on the inner end thereof bent as shown in Fig. 8 to receive screws 69 that pass through the front board 36 of the control.

The other part of the front of the switch includes an insulating plate 61 secured across the rest of the front edges of the walls 56 and 57.

A stud 62 has a flange 63 thereon against which the tube 50 abuts, there being a boss 64 to hold the tube from slipping away from the stud. A pin 65 passes through the stud and rides in slots 66 in the walls 56 and 57, whereby to hold the stud against rotation, while permitting axial displacement.

A washer 67 surrounds the stud and abuts against the back wall 55. A conical coil spring 68 is compressed between the collar 63 and the washer 67, and urges the stud 62 outwardly toward the back of the instrument.

The inner part of the stud 62 is reduced in size to provide a shoulder against which rests a washer 70. The stud is threaded to receive an adjustment cap 72 having a kerf 73 accessible through a hole 74 in the front board 36. The cap passes through and is guided by an opening 75 in the plate 58.

A sleeve 76 surrounds the stud and has a shoulder between which and the washer 70 is disposed a conical compression spring 77. A self-centering washer 78 engages over the shoulder of the sleeve 76 and it, in turn, is engaged by contact depressions 79 on a primary lever 80. The primary lever is mounted on a pivot pin 81 supported in the walls 56 and 57.

The primary lever has its outer end in contact with a secondary lever 84 pivoted on knife-edge bearings 85 formed in the walls 56 and 57. A coil spring 86 is attached to a projection on the secondary lever and to a a lug 87 struck out from the plate 58, the spring 86 urging the secondary lever in a direction to contact the primary lever 80.

The secondary lever has a mid-section formed of insulating material and having an opening surounding the stud, (see Fig. 14). At its outer end, the secondary lever has an H-shaped double armature 90 (Figs. 13 and 14), the legs of which are on opposite sides of and span the poles 91 of a magnet unit, these poles being embedded within a mass 92 attached to and insulated from the back member 55. Spark breaking projections 93 extend inwardly from the mass 92, they being oppositely magnetically polarized. For their action, reference is made to application Serial No. 224,838 of Claude M. Garner, filed August 15, 1938.

Adjacent its outer end, the secondary lever has a stop 95 that limits its travel toward the back plate by contact with the mass 92. A contact plate 96 (Fig. 18) has a pin 97 extending therefrom and passing through the secondary lever. The contact plate also has a fork 98 astride the member 95, and a prong 99 within a slot 100 (Fig. 13), by means of which the contact plate has a limited movement away from and toward the secondary lever. A leaf spring 101 is secured to the secondary lever and acts against the pin 97 to urge the contact plate away from the secondary lever.

The contact plate ends span two contacts 103 and 104 (Fig. 13) mounted upon angular (see Fig. 8) conducting brackets 105 and 106, respectively, attached to the plate 61. Terminals 107 and 108, respectively, extend through the plate 61 for the two contacts 103 and 104.

An adjusting screw 102 (Fig. 8) is threaded into the plate 61 and secured by a lock nut to limit the movement of the secondary lever toward the front of the switch.

The foregoing contacts form the main switch portion in that, as will be seen, they control the main or high-voltage circuit. There is, however, an additional switch operated by the secondary lever within the secondary circuit of the control.

In Figs. 8, 11 and 12 it is seen that there are two spacer posts 110 attached to the secondary lever. A bridge member 111 spans the two posts and to it is riveted a spring switch blade 112 having a contact element 113 at its outer end. A flexible lead 114 is attached to the rivet securing the blade 112 to the bridge 111.

The contact 113 alternately engages contacts 115 and 116. The contact 115 is attached to a bracket 117 secured to the plate 61. A terminal 118 passes through the plate 61 and forms electrical communication with the bracket 117. The contact 116 is attached to a bracket 120 secured to the plate 61 and having its terminal 121 extending to the front of the plate.

When the secondary lever closes the main switch contacts 103 and 104, it also closes the switch blade 112 with the contact 115. When the main switch is open, the contact 113 closes with the contact 116. As is evident, the action of the secondary lever occurs with a snap in both directions as the two armatures approach the magnetic poles 91.

Reset switch

There is a reset switch generally indicated at 127 (Figs. 6, 8 and 9) secured to the front board 36. It includes a spring blade 128 attached in an insulating block 129 to the panel board 36 and having an electric terminal 130 (Fig. 9) projecting from one side thereof. The spring blade has a double contact 131 on its free end. The contact 131 is normally in touch with a fixed contact 132 on a short bracket 133, attached to the front board 36 and having a terminal 134 at its other end.

Opposite the contact 132 is a second contact 135 attached to a bracket 136 likewise secured to the front board 36 and having a terminal portion 137 thereon.

A push button member, generally indicated at 140, projects from the front board 36 and through the front housing. A spring 141 surrounds a reduced portion of this push button 140 and urges it outwardly toward the front of the instrument. A further reduced portion 142 passes through the board 36 and has a collar 143 therearound to prevent its removal. The push button may be pressed toward the back of the instrument until the shoulder 144 strikes the board 36, at which time it will have contacted the spring blade 128 to displace the contact 131 away from the contact 132 and against the contact 135.

Control motor and cams

There is a control or timing motor 147 secured to the board 36 and operating through suitable gear reduction mechanism, generally indicated at 148, two timing shafts 150 and 151. The shaft 150 is designed to make twelve revolutions to one of the shaft 151. Normally, the shaft 150 rotates one time a minute. Both shafts project outwardly in front of the board 36 and have cams thereon.

On the shaft 150 is mounted a cluster of cams indicated at 152 which includes a hub member 153 secured by a set screw 154 to a flat on the shaft. The hub member 153 has a forwardly projecting portion 155 on which are mounted two cams 156 and 157 held properly away from each other by suitable spacer members. A pin 158 fixes the relationship of these cams. A screw 159, cooperating with a washer 160 is threaded into the portion 155 to hold the cam elements removably onto the hub portion 155.

The cam 156 includes a single lobe 162 of approximately 30° angular extent (Fig. 16). The cam 157 has a single notch 163 of approximately 18° angular extent (Fig. 4).

On the shaft 151 is a hub member 165 secured by a set screw 166 and having a projecting portion 167. About the projecting portion 167 are three cams 168, 169 and 170, all held in spaced relation by suitable spacers and secured to the hub member by a screw 171 and a washer 172. A pin 173 fixes the angular relationship of these three cams.

The cam 168 (Fig. 15) has a notch 174 of approximately 62½° angular extent. It also has a lobe 175 of approximately 27° angular extent. The cam 169 (Fig. 16) has a lobe 176 of approximately 20° angular extent. The cam 170 (Fig. 4) has a deep notch 177 and a shallow notch 178. The notch 177 is of approximately 15° angular extent, and the notch 178 of approximately 17½° angular extent.

The cam switches

There is a switch 185 (Figs. 16 and 22) operated by the cam 156. This switch is secured through insulating blocks to a bracket 186 attached to the front side of the board 36. The switch includes a spring blade 187 having a contact 188 and a terminal 189; and also it includes a spring blade 190 having a contact 191, a terminal 192 and a cam follower arm 193, adapted to be engaged by the cam lobe 162 which causes movement of the blade 190 to bring the contacts 191 and 188 together. This arrangement is such as to cause the switch 185 to be closed for approximately five seconds out of each minute if the cam shaft rotates once a minute. This may be seen by reference to Fig. 21.

There is a second switch 195 (Figs. 4 and 22) likewise secured to the bracket 186 on the board 36. It has a spring blade 196 (second in order reading upwardly in Fig. 4) having a contact 197 and a terminal 198 at its other end; and a second spring blade (fourth in order, Fig. 4) 199 having a contact 200, a terminal 201 and a cam follower arm 202 that engages the cam 157 and is disposed into the notch 163 for an interval of approximately three seconds. Normally, the switch 195 is closed and it is, therefore, open for only this short interval. (Compare Fig. 21).

The inner cam 168 on the shaft 151 operates a multiple switch 205. This switch includes several blades separated by insulators and attached to the board 36 by a bracket 206. There is a blade 207 having a contact 208 and a terminal 209; a blade 210 having a double contact 211 and a terminal 212; a blade 213 having a double contact 214 and a terminal 215; and there is a blade 216 having a contact 217, a terminal 218, and a cam follower arm 219 that engages with the cam 168 (Fig. 15).

Normally, the cam 168 is in the position shown, such that the blades 216 and 213 are together closing contacts 217 and 214. These two contacts are designated as part *a* of switch 205. When the cam rotates so that the follower 219 slips into the notch 174, the switch will open altogether. At the end of this interval, the follower 219 will begin to ride up on the cam lobe 175. This will first close the contacts 217 and 214 again, as designated 205*a* on Fig. 22. Almost immediately thereafter, the contacts will be displaced a greater amount to bring the contact 214 against the contact 211, these two contacts being designated as part *b* of switch 205, as shown on Fig. 22; and a short interval thereafter there will be additional displacement closing the contacts 211 and 208, designated part *c* of switch 205, shown on Fig. 22. Approximately fifty seconds later the cam follower 219 will leave the lobe 175 which will open parts *b* and *c*, but will leave part *a* closed which latter will remain closed until the expiration of approximately ten minutes from the start of the cycling, as shown on Fig. 21.

There is a switch 225 (Fig. 16) consisting of a pair of spring blades secured by a bracket 226 to the board 36. There is a switch blade 227 having a contact 228 and a terminal 229. Duly insulated therefrom there is a second switch blade 230 having a contact 231, a terminal 232 and a cam follower arm 233 that engages the cam 169. The switch 225 is normally open and is closed when the cam lobe 176 engages the arm 233, to hold the switch closed for an interval of approximately forty seconds as shown in Fig. 21.

There is a double switch 235 (Fig. 4) that is also attached by the bracket 226 to the board 36. The switch 235 has a blade 236 (second down, Fig. 4) having a contact 237 and a terminal 238. The switch also includes a blade 239 (third down, Fig 4) that is part of the same piece of material as is the blade 230 of the switch 225. The blade 239, therefore, does not need an additional terminal. It does have a two-way contact 240 and a cam follower arm 241 that engages with the cam 170. There is a third blade 242 (fourth down, Fig. 4) that has a contact 243 and a terminal 244.

Figure 22:
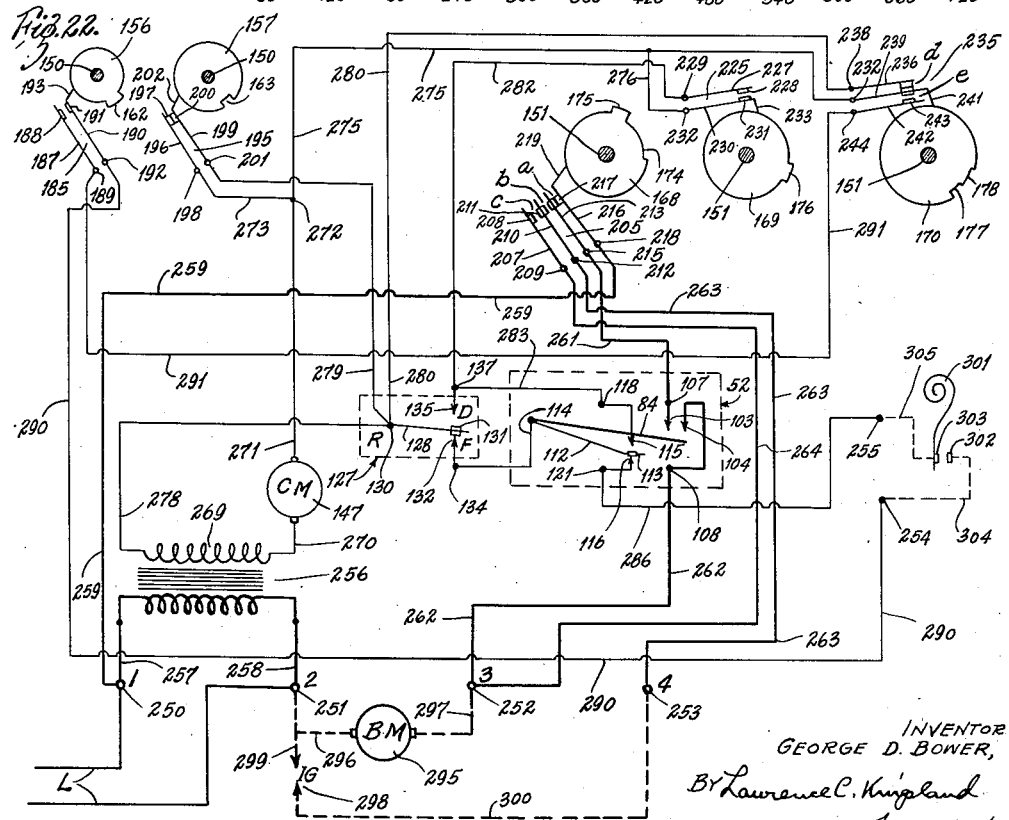
Fig. 22 is a wiring diagram.

Normally this switch is positioned by the cam 170 acting upon the arm 241 to close the contacts 237 and 240, designated part *d* of switch 235, shown in Fig. 22. However, when the notch 177 reaches the arm 241, the arm drops, opening the contacts 240 and 237 and closing the contact 240 with the contact 243, the latter being designated on Fig. 22 as part *e* of switch 235. This last remains closed for an interval of approximately thirty seconds, as indicated at 235*e* in Fig. 21. At the end of this interval the cam follower arm 241 rides into the shallower notch 178 in which the contact 240 is free of both the contacts 237 and 243, so that this switch remains entirely open for an interval of approximately thirty-five seconds, as is indicated by the gap between *d* and *e* in Fig. 21. At the end of the notch 178 the arm 241 again moves outwardly and closes the part *d*, as indicated in Fig. 21.

*Connections in the control*

The mechanism is provided with four main high voltage terminals 250, 251, 252 and 253 for the high voltage connections. These terminals receive connections on both the inside and outside of the board 36. There are also thermostat terminals 254 and 255 of like character, but which are low voltage connections.

Power lines L from a suitable source are connected to the front side of the terminals 250 and 251. A transformer 256 has a main lead 257 connected to the backside of the terminal 250, and a lead 258 connected to the terminal 251.

To the terminal 250 there is also attached a lead 259 that passes through a hole 260 in the board 36 and is attached to the terminal 218 of the blade 216. From the terminal 215 of the blade 213 there extends a lead 261 through the hole 260 to the terminal 107 of the bonnet switch. From the terminal 108 of the stack switch a lead 262 extends to the main terminal 252.

Returning the switch 205, from the terminal 212 of the blade 210, a lead 263 extends through the hole 260 to the main terminal 253; and similarly from the terminal 209 of the blade 207 a lead 264 extends to the main terminal 252.

The foregoing completes the main or high voltage circuits, which are shown in heavy lines.

The secondary or low voltage circuits originate in the secondary 269 of the transformer 256, and they all are concerned with the operation of the control or timing motor 147, which, therefore, is in series with all of them. From this secondary 269, a lead 270 extends to the clock motor 147. From the other side of the clock motor, a lead 271 extends to a junction 272. From the point 272, it branches in a line 273 extending through a hole 274 to the terminal 198 of the switch 195.

From the point 272, the other branch 275 extends through a hole 277 to the terminal 232 that is common to the blades 230 and 239 of the switches 225 and 235, respectively. (In the wiring diagram, Fig. 22, for clarity, the blades are separated but are connected by a lead 276.)

From the other side of the secondary of the transformer, a lead 278 extends to the terminal 130 of the reset switch 127. From this point, it branches and a lead 279 extends through the hole 274 to the terminal 201 of the switch 195. A second branch 280 extends from the terminal 130 through the hole 277 to the terminal 238 of the switch blade 236.

From the switch 225, at the terminal 229 of the blade 227, a lead 282 extends through the hole 277 to the terminal 137 of the switch 127. From this terminal, a lead 283 also extends to the terminal 118 of the stack switch.

From the terminal 134 of the switch 127, the flexible lead 114 extends to the switch blade 112 of the secondary stack switch.

From the terminal 121 of the stack switch, a lead 286 extends to the thermostat terminal 255. From the other thermostat terminal 254, a lead 290 extends through the hole 274 to the terminal 192 (Fig. 16) of the blade 190 of the switch 185. From the other terminal 189 of the blade 187 of this switch, a lead 291 extends through the hole 274 through the hole 277 to the terminal 244 of the blade 242 of the switch 235. The external connections include in the main circuit a burner motor, generally indicated at 295, connected by leads 296 and 297 with the main terminals 251 and 252, respectively. The external connections also include an ignition device 298 connected by leads 299 and 300 with the main terminals 251 and 253, respectively.

In the secondary circuit, the external connections include a room thermostat 301 adapted to close its contacts 302 and 303. A lead 304 connects the contact 302 with the terminal 254, and the lead 305 connects the contact 303 with the terminal 255.

The operation of the device is as follows:

At the start it will be assumed that the cam 156 is in position to hold the switch 185 closed. At the same time, the cam 157 is in position to hold the switch 195 open by engagement of the follower 202 in the cam notch 163. The cam 168 is positioned to maintain switch 205 completely open by engagement of the cam follower 219 in notch 174. The cam 169 is in position to hold the switch 225 open and the cam 170 is in position to close switch 235*e* by engagement of the cam follower 241 in the deep notch 177. The stack switch is open, except at 116, which insures that the high voltage circuit is open.

Thus far, the circuit is merely ready to start. Should the room cool and act upon the thermostat 301 to close contacts 302 and 303, a circuit will be completed in the secondary. Starting at the contact 302, the circuit will be: lead 304, terminal 254, lead 290, terminal 192, switch 185, terminal 189, lead 291, terminal 244, switch 235e, terminal 232, lead 275, junction 272, lead 271, control motor 147, lead 270, secondary 269, lead 278, reset switch terminal 130, lade 128, contact 131, contact 132, terminal 134, lead 114, blade 112, contact 113, contact 116, terminal 121, lead 286, terminal 255, lead 305, and contact 303.

With the closure of this circuit, the timing motor 147 begins to operate. In so doing, it first causes the cam 157 to eject the cam follower 202 from the notch 163 and close the switch 195. In accordance with the desirable order of Fig. 21, this occurs three seconds after the initiation of the cycle. It provides a holding circuit for the motor 147. The previously described circuit remains unchanged, but the holding circuit to the motor 147 is closed as follows, beginning with the terminal 201 of the switch 195: terminal 201, lead 279, terminal 130 of the reset switch 127, lead 278, secondary 269, lead 270, motor 147, lead 271, junction 272, lead 273 and terminal 198. It will be seen that closing of this holding circuit insures that (absent power failure) the motor 147 will run until the notch 163 again opens the switch 195, which will not occur until the end of sixty seconds after institution of the cycle, as appears in Fig. 21. Thus, even though five seconds after the start, the cam 156 opens the switch 185, or even though thirty seconds after institution of the cycle the cam 170 opens the switch 235, or even though the thermostat 301 should open, the circuit will be held until the end of this starting phase interval, by the switch 195.

Five seconds after institution of the cycle, the motor 147 will not only have opened the switch 185, but will also have rotated the cam 168 so that its cam lobe 175 has begun to lift the follower arm 219 of the switch 205 to an extent sufficient to close the switch 205a. This partially closes a high voltage circuit between the main terminals 250 and 251 as follows: terminal 250, lead 259, terminal 218, switch 205a, terminal 215, lead 261, terminal 107 of the stack switch and contact 103 of the stack switch. This switch is in the cold position and so this circuit is broken at the point 103. However, a second later, by virtue of continued rotation of the motor 147, the switch 205b is closed by bringing together contacts 214 and 211. This closes high voltage circuit as follows: terminal 250, lead 259, terminal 218 of the switch 205, switches 205a and 205b, terminal 212, lead 263, main terminal 253, external lead 300, ignition device 298 and lead 299 and the main terminal 251.

Sparking of the ignition device then begins within the furnace. At its inception, however, there is no fuel supplied, since the motor 295 has not been put in circuit.

One second later, continued rotation of the cam 168 closes the switch 205c and brings together the contacts 211 and 208. This closes the circuit that short circuits the stack switch and so puts the burner motor 295 in circuit as follows: main terminal 250, lead 259, terminal 218 of switch 205, switches 205a, 205b, and 205c, terminal 209, lead 264, main terminal 252, lead 297, motor 295, lead 296, and main terminal 251. The burner motor, therefore, starts and sends combustible fuel mixture into the furnace, which is ignited by the previously or concurrently started ignition mechanism 298. Both the burner motor and the ignition mechanism are held in operation for a definite interval of time, such as one minute, by the cam lobe 175, its cam 168 being rotated by the control motor 147 which is held in circuit until the end of a full minute by the holding cam 157.

The foregoing is the starting phase of the cycle.

As previously observed, the switch 235e is opened at the end of thirty seconds from the beginning of the cycle. No change is produced by this, however, as the holding cam 157 continues the motor 147 through the switch 195 until the end of a minute.

In normal operation, ignition will occur and the furnace will immediately supply heat to the thermutator 32. This heat will move as a wave against the thermutator fast enough to cause shifting of the stack switch to the second position, shown in Fig. 8, wherein the blade 84 closes together the contacts 103 and 104 and the blade 112 closes with the contact 115. Of course, this occurs only if ignition takes place. Its effect is to open the room thermostat circuit again, at 116, but also, by closing with 115, to cock the circuit of the control motor through the switch 225, so that it can be held upon closure of that switch, as will appear hereafter. It also closes the main circuit through the switch 205a as follows: main terminal 250, lead 259, terminal 218, switch 205a, terminal 215 thereof, lead 261, terminal 107 of the stack switch, contact 103, blade 84, contact 104, terminal 108, lead 262, terminal 252, lead 297, motor 295 and lead 296 to terminal 251. The circuit is set up then to hold the burner motor in operation after the short circuit through blade 207 of switch 205 is broken, provided of course the thermutator 32 is not changed.

As forecast, there is set up by this action of the stack switch, an additional intermediate holding circuit for the timing motor 147, which holding circuit is thereby dependent upon there being effective ignition. This circuit, beginning at the motor 147 is as follows: lead 271, point 272, lead 275, (branch 276) terminal 232 of the switch 225 (which switch is closed beginning 40 seconds after initiation of the cycle, as shown in Fig. 21), terminal 229, lead 282, terminal 137 of the reset switch, lead 283, terminal 118 of the stack switch, contact 115, blade 112, lead 114, terminal 134 of the reset switch, contact 132, contact 131, blade 128, terminal 130, lead 278, secondary 269, and lead 270 to the motor 147. This holding circuit for the motor 147 is closed at the switch 225 only after passage of forty seconds or ten seconds after switch 235e has opened, which gives time for the ignition to be effective. If the ignition is effective on the stack switch at any time prior to the expiration of the minute during which the holding cam 157 keeps switch 195 closed, the motor 147 will be kept in operation by the switch 225 and its circuit for an interval until eighty seconds after start of the cycle. If the ignition is ineffective at the end of the minute, the circuit through the switch 225 will be broken at 115, and the whole mechanism will stop upon opening of the switch 195. Thus the switch 225 is an intermediate holding circuit switch, dependent upon ignition, to bridge between the starting and running phases of the cycle.

Continuing normal operation and assuming effective combustion, the switch 225 will close and it will keep the motor 147 running. At the end of sixty seconds, the switch 195 will open but the switch 185 will be closed again. The latter is immaterial, since its circuit is open at several points. Also at the end of about a minute, the switches 205b and 205c open. Thus, at the end of a minute the short circuit to the burner motor around the stack switch is broken, and the circuit for the ignition device is open. The main circuit for the burner motor continues through the hot stack switch. As shown in Fig. 21, its circuit is held by the cam 168 for an interval of ten minutes, but is at all times dependent upon the maintenance of heat in the burner and is opened in the event the fire fails, and also in case power fails.

After the expiration of sixty-five seconds, the cam follower 241 rides out of the shallow notch 178 and onto the body of the cam 170. This closes the switch 235d. This closes a running phase holding circuit for the control motor 147 as follows: lead 271, junction 272, lead 275, terminal 232 of switch 235, terminal 238 thereof, lead 280, terminal 130 of reset switch 127, lead 278 secondary 269, and lead 270 to the motor 147. If this holding circuit closes, it continues for almost the remainder of the full twelve minute cycle but terminates about ten seconds short of this limit as appears in Fig. 21. It will be remembered that, since it is dependent upon operation of the intermediate holding switch 225, it can never close unless ignition has taken place, and that once it does close, it insures a complete cycling of the running phase of the control motor 147. It will further be observed that even though, after institution of this main holding circuit, the burner motor circuit is broken, the timing motor 147 will continue to operate for the remainder of its cycle, returning to starting position.

Furthermore, in normal operation, this means that the burner motor will always be operated for a period of approximately ten minutes, regardless of the condition of the room thermostat. The burner motor, of course, stops when the cam follower 219 of switch 205 falls into the notch 174 which it does at the end of ten minutes. Thereafter, the cycle continues until the switch 235d opens its holding circuit, during a scavenging period.

The foregoing is a normal cycle of operation. Continuation of the heater by recycling is made dependent upon return of the unit to starting position. At the time the switch 235d opens its holding circuit, the holding circuit through the switch 195 is closed by cam 157, since the fast cams 156 and 157 recycle their switches every minute. When the switch 235d opens the holding circuit, it closes at 235e in the room thermostat circuit, but the motor 147 continues under the holding circuit of cam 157 until that circuit opens. However, just prior to opening of the switch 195, the switch 185 in the thermostat circuit is closed by the cam 156. When the burner motor stops by opening of the switch 205a, after ten minutes, the thermutator 32 at once cools to return the stack switch to starting position as heretofore described, regardless of the particular temperature of the tubes at the time the burner stops. The cycle then continues for at least the duration of the scavenging period, after which the switch 235d opens.

Recycling can then begin if the room thermostat closes or remains closed, as the other switches 185, 235e and 52 are in starting position.

As above described, the thermutator 32 shifts promptly upon temperature changes. For this reason, ignition will cause shifting of the stack switch to its upper position in Fig. 22 almost immediately and in sufficient time to effectuate the intermediate holding circuit through the switch 225 when the starting holding circuit through switch 195 breaks after the first minute of the cycle.

*Abnormal operations*

As observed, the starting phase runs its full minute under any circumstances, but the running phase carries on only if the starting effectively caused combustion, so that the intermediate holding mechanism could bridge the gap between the two.

If the burner is not ignited during the starting phase (such as by a breakdown of the ignition mechanism), or failed to be effective throughout the gap between the phases, (such as by power failure) so that the stack switch is open at the end of the starting phase, the main circuit to the burner motor, and the secondary circuit through the timing motor are opened at the end of the starting phase. Thereafter it would be necessary to reset the unit manually, by depressing the button 140. This establishes a circuit through the intermediate holding switch 225 that short circuits the stack switch as follows: motor 147, lead 271, point 272, lead 275 (branch 276), terminal 232, switch 225, terminal 229, lead 282, terminal 137 of reset switch 127, contact 135, contact 131, blade 128, terminal 130, lead 278, secondary 269, lead 270 to the motor. The button is held down until switch 235d closes the running holding circuit, which will complete the cycle and return it to starting position.

In the event the flame stops, during the running phase, after closing of holding switch 235d, there will be a rapid lowering of the temperature of the tube 48 and, consequently, rapid shifting of the stack switch to its lower position. This immediately cuts out the motor 295, but the timing motor 147 continues to the end of its cycle since its running holding circuit is not in series with the stack switch, but is held by the switch 235d. Upon return to starting position, recycling can occur, with new ignition, if the room thermostat demands heat.

In the event of power failure during the starting phase, the stack switch will cool, and upon return of power, the starting phase will take up where it left off. If the remainder is insufficient to produce starting, and heat change to shift the stack switch, the intermediate holding circuit through the switch 225 and the stack switch will not close, stopping the cycle, and requiring manual reset. If the power failure occurs during the intermediate holding phase, which assumes effective starting, the thermal inertia of the thermutator 32 may hold the stack switch in hot position for the remainder of the five seconds' duration of the intermediate phase, and until the running holding circuit can cycle out. Otherwise (and the thermutator is normally responsive in three seconds or less), the switch 225 will open, and manual reset will be necessary.

If power failure occurs during the running phase, the cooling of the thermutator 32 will open the circuit to the burner motor and cut off the supply of fuel. Subsequent restoration of power cannot restart the burner motor after the starting period, since the ignition mechanism is inoperative; with the result that the stack switch does not heat and reclose. However, the restoration of power will cause the timing motor to complete its cycle and be ready for recycling in the event the room thermostat still calls for heat.

It is apparent that this mechanism could be used where there is a pilot, since this would involve merely lifting the terminal 253 out of circuit.

In the foregoing, it will be seen that there is in every cycle a definite starting time interval, a definite running time interval followed by a definite inactive interval of the burner. There is always an independent ignition actuation operating for a fixed period of time which starts with or before the fuel and air supply. Manipulation of the thermostat cannot effect the predetermined operating cycle, because the thermostat is ineffective after a few seconds once the cycle is initiated.

Likewise there is provided a burner control and a device operative in response to rate of heat changes, so that the control is subjected to operations dependent upon the existence or nonexistence of a supply of heat, producing heat changes, rather than upon a given amount of heat or value of temperature.

What is claimed is:

1. In a mechanism of the kind described, a burner, a fuel supply means therefor, an ignition device for the burner, a space thermostat, means operable upon shifting of the space thermostat to cause operation of the ignition device and the fuel supply means, means to maintain both of said operations for a given first time interval, means effective a period after ending of said first interval for maintaining the supply means in operation for a given second time interval, and means dependent upon combustion of the fuel to hold said supply means in operation from the first interval to the second.

2. In a mechanism of the kind described, a temperature-change producing means, an automatic external control device actuated in response to predetermined external conditions, a starting means to render the temperature-change means effective, means to sustain the operation of the temperature-change means, and a control mechanism adapted to be put into operation by the automatic exteranal control device, said control mechanism including means to operate the starting means, means to cause operation of the first means by the starting means, means to maintain the first means in operation for a predetermined interval after starting, and means to prevent its restarting for a second predetermined period after the first interval.

3. In a mechanism of the kind described, a temperature-change producing device, means to start the same, means to run the same, means to stop the same and prevent its running, means coordinating said several means to cause them to cycle in the order named within a fixed time interval and then to recycle, and an over-all automatic control device adapted to determine the start of the cycle, said control device being thereafter ineffective to stop the same until the end of a cycle.

4. In a mechanism of the kind described, a burner, a temperature device to receive immediately the heat from burning therein, means to supply fuel to the burner, and timing mechanism including a timing motor, means to cause starting of the timing motor, first means to maintain the motor operating during a given starting period, means operated by the timing motor to cause operation of the fuel supply means, means to maintain the supply means and the timing motor in operation after the starting period including the timing motor and a circuit therethrough, said circuit also passing through the temperature device only when it is hot, and means operated by the timing motor to stop the supply means after operation thereof for a predetermined interval of time after said starting period.

5. In a mechanism of the kind described, a burner, a fuel supply means therefore, an ignition means, a room thermostat, a temperature-responsive device located so as to be shiftable promptly in response to changes in temperature produced by the burner, a reset switch, and a timing mechanism, said timing mechanism having a motor and a plurality of cam switches operated thereby, a first circuit including in series a first cam switch, the room thermostat, a second cam switch, the temperature-change device in cold position, and the reset switch in normal position, and the two cam switches being closed at the start of the cycle, the timing motor starting upon closing of the circuit by the room thermostat, the two cam switches being opened shortly after starting of the motor, a second circuit and a third cam switch closed in the second circuit prior to opening of the first circuit, and being adapted to hold the timing motor in operation a predetermined period after start of the cycle, independently of the first circuit, a third circuit including the temperature-change device in hot position, and a cam switch therein adapted to be closed during the starting period, a fourth circuit including the ignition means, and a cam switch in the circuit adapted to be closed during the starting period, a fifth circuit including the supply means and independent of the temperature-change device, the timing motor, during the starting period, causing the fifth and fourth circuits to be closed, and causing its part of the third circuit to be closed, the fifth and fourth being subsequently opened at the end of the starting period and the third being closed then if ignition occurs to shift the temperature-change device to hot position, a sixth intermediate holding circuit including the timing motor, the temperature-change device when hot, and the reset switch, and including a cam switch closed when the second circuit opens, the cam switch remaining closed for an intermediate period, whereby to hold the timing motor in operation for said intermediate period if ignition shifts the temperature-change device, and to stop the motor if ignition fails, the reset switch in said circuit being shiftable manually to short circuit the temperature-change device, and a seventh circuit including a cam switch and the motor, adapted to be closed prior to ending of the intermediate period by opening of the sixth circuit, said seventh circuit, when closed, being held closed at its cam switch for the duration of a running period, and the third circuit being opened by its cam switch at a predetermined time before end of the running period, the first circuit timing cams being closed at the end of the running period, whereby recycling can occur if the room thermostat is closed.

6. In a control system, a burner device, an external control device, means to cause operation of the burner device for a starting period, including the external control device, and means for maintaining the burner device in operation for a running period, independent of said external control device, and means independent of said external control device for stopping the burner device at the end of said running period.

7. A method of operating burner devices requiring ignition, comprising the steps of starting the device upon temperature demand, continuing its operation upon occurrence of ignition, maintaining its operation for a measured interval after start, and then causing it to stop regardless of the temperature demand.

8. A method of operating burner devices requiring ignition, comprising the steps of starting the device upon temperature demand, continuing its operation for an ignition interval and maintaining its operation for a predetermined measured running interval after said ignition interval, and then causing it to stop regardless of temperature demand.

9. A method of operating burner devices requiring ignition, comprising the steps of starting the device upon temperature demand, continuing its operation upon occurrence of ignition, maintaining its operation for a measured running interval, causing it to stop at the end of said measured running interval, preventing its operation for a scavenging period after the running interval, and then recycling it upon further or continued temperature demand.

10. In a control mechanism, a burner device requiring ignition, external control means, and a cycling device, said cycling device having means to cause starting of the burner device upon operation of the external control means, and including means dependent upon occurrence of ignition to maintain the burner device in operation for a measured interval after the starting, means to stop the burner device at the end of said measured interval, and means thereafter to return the cycling device to its original condition.

11. In a control mechanism, a burner device requiring ignition, an external control means, and a cycling device, said cycling device having means to cause starting of the burner device upon operation of the external control means, means dependent upon occurrence of ignition to maintain the burner device in operation for a measured interval after starting, means to stop the burner device at the end of said measured interval, means to prevent restart for an additional interval, and means to return the cycling mechanism to its original condition at the end of said additional interval.

12. In a control mechanism, a burner device requiring ignition, an external control means, and a cycling device, said cycling device having means to cause starting of the burner device upon operation of the external control device, means to stop the burner device if ignition does not occur, means to continue operation of the burner device for a measured interval after starting if ignition does occur, and means thereafter to stop the same.

13. In a mechanism of the kind described, a burner device requiring ignition, a cycling mechanism therefor including a control motor, automatic means responsive to changes in physical conditions to cause said control motor to start, means operated by the motor to cause the burner device to operate, means dependent upon ignition to maintain the burner device in operation, and means maintaining the control motor in operation at all times during operation of the burner device.

14. In a mechanism of the kind described, a temperature-change device, a first circuit, a member in said circuit to be operated upon closure thereof, and control mechanism for the circuit, said control mechanism including a first switch adapted to open and close repeatedly in short cycles, and a second switch adapted to close during one of said cycles but to open thereafter for a plurality of said cycles to render said first switch ineffective to close the circuit after said first cycle, a second circuit, with means to close the second circuit when the second switch is open, and mechanism adapted to be operated by each of said circuits, said mechanism being adapted for control of said temperature-change device.

15. In a mechanism of the kind described, a burner device dependent upon ignition, a circuit therefor, switch means in the circuit, a control motor for operating said switch means, circuits for the control motor comprising an instituting circuit to cause starting of the control motor, a holding circuit to insure operation of the control motor for a predetermined period regardless of the instituting circuit, a running circuit to hold the control motor in operation for a running period beginning after the end of the holding circuit period, and an intermediate circuit dependent upon effective ignition to continue operation of the control motor from the end of the holding circuit period to the beginning of the running period, and a circuit controlled by the control motor to hold the burner device in operation during the running period.

16. In a mechanism of the kind described, a burner device, means including a space thermostat to start said burner device, automatic control mechanism including means to render the thermostat ineffective to stop the device, and maintain the device in operation independently of the thermostat for an interval, and said automatic control mechanism including means independent of the thermostat to stop the device.

17. In a mechanism of the kind described, a burner device, a space thermostat adapted to operate in response to temperature changes controlled by the burner device, and control mechanism producing a complete cycle of operation of the burner device including starting the same, running it for a running interval and stopping it after said interval, said control mechanism having means dependent upon the room thermostat for starting the operation, and means independent of the thermostat for stopping it after said running interval.

18. In a mechanism of the kind described, a burner device, a circuit therefor, a control device including a control motor and switches operated thereby, a first circuit for the control motor, one of the switches being in the burner device circuit and one being in the control motor circuit, and alternate circuits dependent upon ignition of the burner device, one for the control motor and one for the burner device, said control motor being adapted to open the first burner device circuit switch not later than it opens its own first circuit switch.

19. In a mechanism of the kind described, a burner device, a control motor and a plurality of switches operated thereby a, stack switch, and a space thermostat, circuit means for the control motor adapted to start the same upon demand by the space thermostat and to maintain the same in operation upon actuation of the stack switch for a predetermined period of time, and then to stop the same, and circuit means for the burner device operated by control motor switches to start the same, to maintain the same in operation upon actuation of the stack switch, and to stop the same not later than the end of the predetermined period of operation of the control motor.

20. In a mechanism of the kind described, a burner device, a circuit for the burner device, an external control device, a timing control, means starting operation of the burner device including the external control, and means to provide a running period for the device, said means including the timing control in operation, and including a switch operated by the timing control, in series with the burner device, whereby the mechanism is dependent only upon continued operability of the timing control to prevent unlimited operation of the burner device.

21. In a mechanism of the kind described, a burner device, a circuit therefor, a timing control device, means in the timing control device to close the burner device circuit for a first interval, means to hold the control device in operation for said interval, means to hold the control device and burner device in operation after said interval and for a second interval dependent upon combustion from the burner device, said control device and said burner device being rendered inoperative after said first interval upon non-existence of combustion, means to maintain the control device in operation for a third interval after said second interval regardless of combustion, means dependent upon combustion to maintain said burner device in operation in said third interval, and means to stop the burner device and control device by the end of the third interval.

22. In a mechanism of the kind described, a burner device, a circuit therefor, a timing control device including a plurality of switches operated in timed relation, a space thermostat, a combustion switch, said timing control device switches including two fast switches operating in a repeating cycle and other switches operating in a long cycle greater than the repeating cycle, a first instituting circuit including a first fast switch, the thermostat, the combustion switch cold and the timing device, said timing device being adapted to thereafter close the second fast switch and after such closing to open the first fast switch, a second circuit for the timing device including the second fast switch, said second circuit being held closed for a first interval, a third timing device switch closed during said first interval, and opened by the end thereof, and a first burner device circuit including said third switch, a third timing device circuit including a fourth timing devce switch closed for a second interval upon opening of the second fast switch, and the combustion switch hot, whereby upon absence of ignition at the end of said first interval the mechanism may stop, a fourth timing device circuit including a fifth timing device switch closed for a third interval a time later than opening of the second circuit, a second burner device circuit including the combustion switch hot and a sixth timing device switch closed prior to opening of the first burner device circuit, and, dependent upon combustion, adapted to maintain the burner device in operation until a time not later than the opening of the fourth timing device circuit, and said timing device being adapted to close its part of the instituting circuit by the time the fourth timing device circuit is opened.

23. In a mechanism of the kind described, a burner device, a timing control device including a plurality of switches operated in timed relation, a space thermostat, a combustion switch, a first circuit for the timing device including the thermostat, and the combustion switch cold, a second circuit for the timing device including a timing switch, said second circuit being adapted to shunt the thermostat, a first burner device circuit including a timing switch adapted to be opened not later than opening of the second timing device circuit, means to open the first timing device circuit when said second timing device circuit is opened, a third timing device circuit including the combustion switch hot, and a fourth timing device circuit adapted to be closed after said third circuit has been closed for an interval, said fourth circuit shunting the combustion switch, a second burner device circuit including the combustion switch hot and a timing switch closed before opening of the first burner device circuit, and opened not later than opening of the fourth timing device circuit, and means to render said first timing switch opening means inoperative at the end of said fourth timing device circuit interval.

24. A mechanism as in claim 23, together with reset means in said third timing device circuit adapted to shunt the combustion switch and start the timing device.

25. In a mechanism of the kind described, a temperature-change device, an automatic external control device adapted to actuate in response to predetermined external conditions, operating means put in operation upon actuation of the external control device, said operating means including mechanism adapted to cause operation of the temperature-change device for a predetermined interval of operation after closure of said automatic external control device, and said operating means including mechanism adapted to prevent further operation thereof for a second predetermined time interval after the first.

GEORGE D. BOWER.